INVENTOR.
ALDRICH L. JACKSON
BY

ATTORNEY

May 27, 1952  A. L. JACKSON  2,598,549
CASING SUPPORT FOR MEAT PROCESSING UNITS
Original Filed July 9, 1948  4 Sheets-Sheet 2
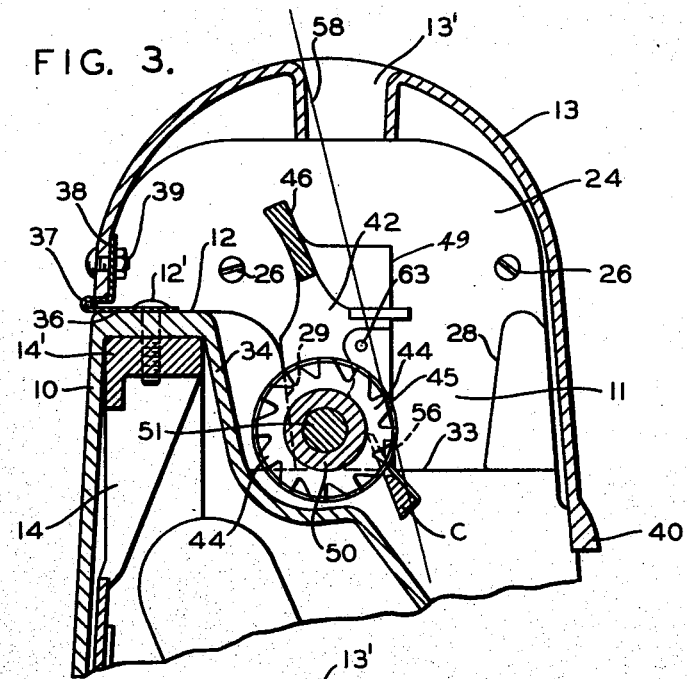
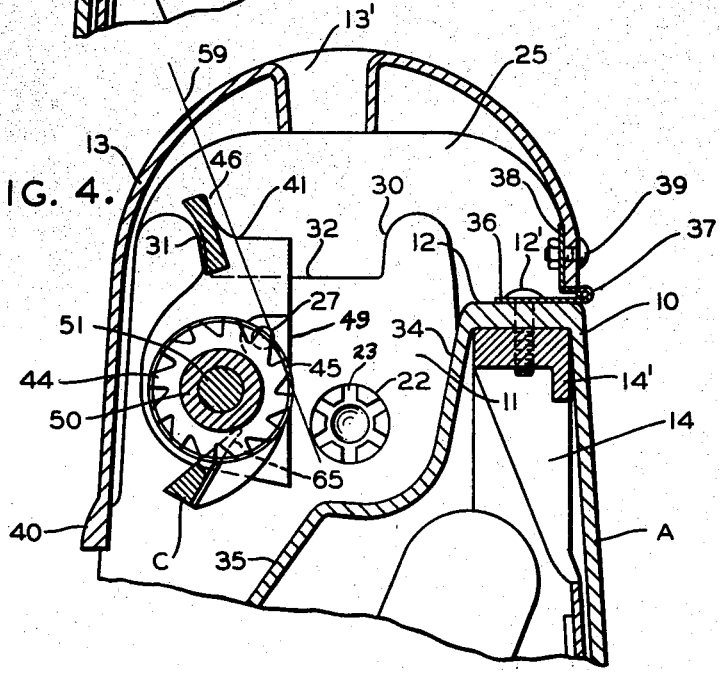
INVENTOR.
ALDRICH L. JACKSON
BY
ATTORNEY

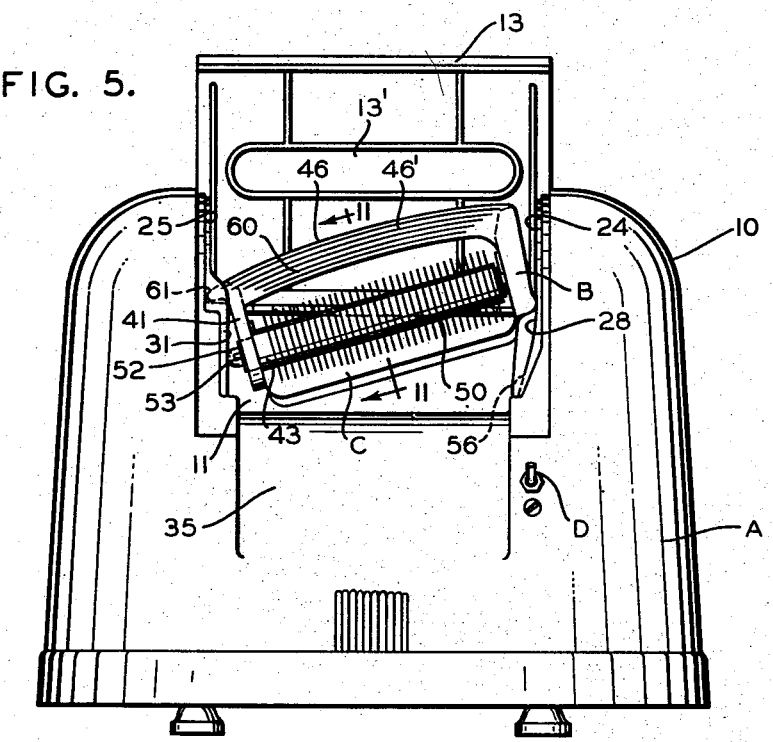

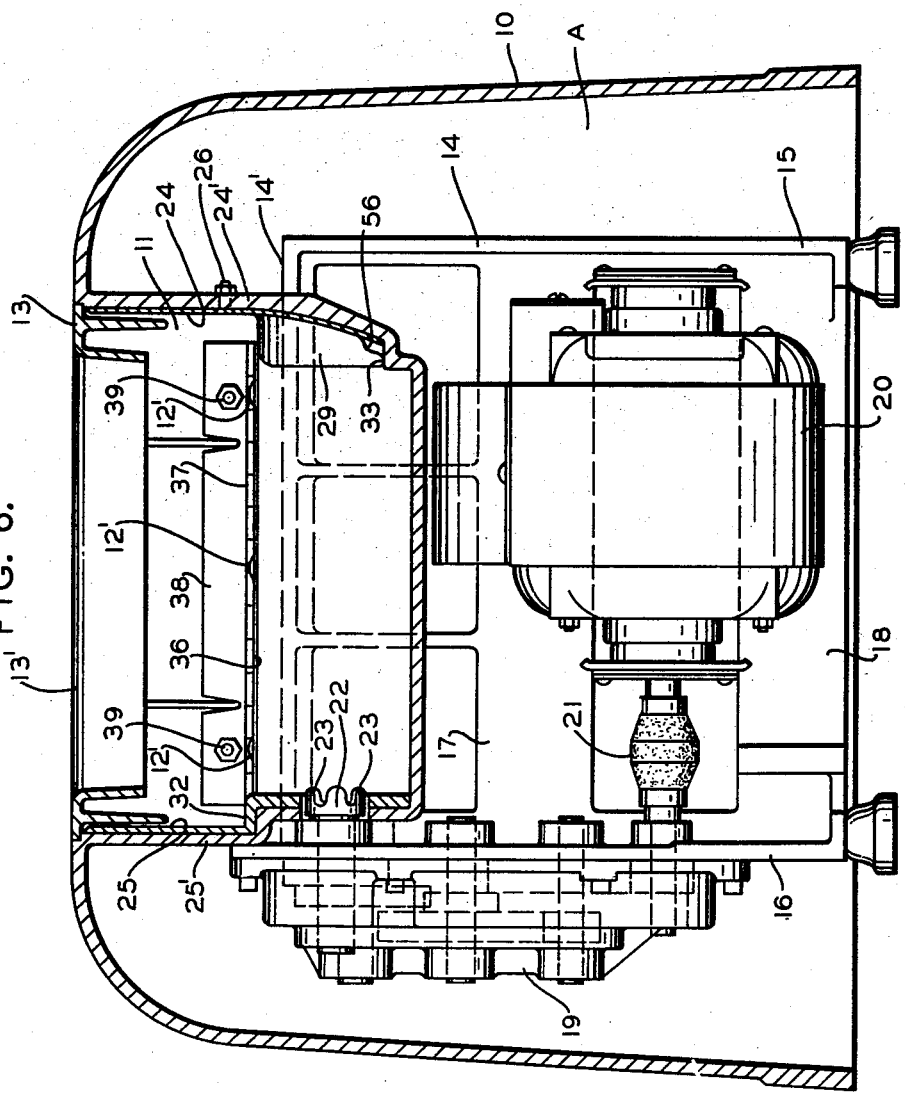

Patented May 27, 1952

2,598,549

UNITED STATES PATENT OFFICE 2,598,549

CASING SUPPORT FOR MEAT PROCESSING UNITS

Aldrich L. Jackson, Eustis, Fla., assignor to Hobart-Federal Engineering Corporation, Minneapolis, Minn., a corporation of Minnesota Original application July 9, 1948, Serial No. 37,776. Divided and this application February 23, 1951, Serial No. 212,291

5 Claims. (Cl. 17—26)

My invention relates to an improvement in a casing support for a meat processing unit through which meat is adapted to be passed for tenderizing.

This application is a division of application Serial No. 37,776, filed July 9, 1948.

A feature resides in providing means for receiving the processing unit which includes a casing adapted to support the processing unit and also house an electric motor transmission unit within the casing.

It is a primary feature of my invention to provide a casing which is adapted to receive the processing or tenderizing unit into operating position to contact the transmission unit by holding the processing unit with one end thereof resting on a receiving shelf in the casing and rocking the other end into position in a recess in the casing in which keystone-like shoulder means receive the ends of the unit as it is rocked into operating position. In this position the tenderizing unit is locked in place. The tenderizing unit can be removed in reverse manner by a rotating movement which lifts one end of the unit out of the keystone-shaped shoulder means, and as this end of the processing unit is raised the other end of the unit is released from the drive transmission, couplers and shoulder means.

It is an important feature to provide casing means for supporting the processing or tenderizing unit so that it can be engaged by one hand of the operator to lift it out of operating position by a simple rotating movement or which may be inserted into operative position by a rotating movement with one hand. Thus I provide a simple means of handling the processing unit so that the free end of the same can be lifted from a locking recess (which is keystone-shaped) and through this lifting movement of the free end of the unit, the other end of the unit is disengaged from the key clutch of the transmission driving unit and the shoulder means.

It is a further feature to provide a casing which will support a removable tenderizing and processing unit for meat and food, the unit being composed of two sections, each of the sections being provided with a shaft upon which are mounted a series of tenderizing knives held spaced apart. The knives of the respective sections overlap and fit between each other when the sections are assembled as a unit.

It is also a feature to provide a casing support for a processing and tenderizing unit, the unit having means of handling the sections of the unit together on one end of a key which permits the sections of the unit to be rotated toward and away from each other in separating the sections entirely from each other and which holds the sections in line with each other on one end and which leaves the other end of the sections free to be separated or to be moved adjacent each other against bearing faces of the end frames of the sections which hold the sections in line vertically when the same are held as a unit within the supporting casing for operation.

An additional feature resides in means for supporting one section of the processing unit in the supporting casing so that it can be operated by the power coupling means and permit the operator to sharpen the blades of the single section. My construction allows either section of the processing unit to be held separately in the recess of the supporting casing, or the sections may be held as a unit when in processing position within the supporting casing.

A further feature of my invention resides in providing a casing in which is formed a central recess having a bottom forwardly inclined declivity or chute wall, the ends of the recess joining this wall to form a smooth closed casing at each end of the recess which provides the recess with a smooth surface throughout its entire form which can be readily cleaned when the processing unit is removed from the casing. I also provide a hinged cover for closing the central recess and which forms a protective means over the top in front of the processing and tenderizing unit when the cover is closed. However, the forwardly inclined wall is spaced from the lower free end of the cover to provide a chute-like opening out of which the tenderized food or meat drops when it leaves the tenderizing unit.

It is also a feature to provide a cover with a longitudinal slot and depending from the slot is a flange which forms a chute-like opening extending downwardly toward the processing unit which guides meat or food to the unit.

It is also an additional feature to provide a casing formed of a single piece which conceals the electric motor and transmission driving unit wherein the central recess is formed to receive the tenderizing unit with shoulders at each end of the recess upon which the ends of the tenderizing unit rest. One of the shoulders receives the end of the tenderizing unit in first engagement, together with clutch engagement in the casing, and the other of the shoulders receives the free end of the tenderizing unit as it is rocked into operative position in the casing. As a result of my construction the recess may be wiped clean thereby providing a sanitary support and casing for the processing unit. The simple form of my casing with the central recess for receiving the tenderizing unit permits the processing or tenderizing unit to be rotated into place for operation with the use of one hand of the operator. The central recess which receives and supports the processing unit has formed integrally therewith in the end walls of the recess the guiding shoulders which coact with the ends of the processing unit to securely position and support the same.

The invention will appear more clearly from the following detailed description when taken in connection with the accompanying drawings showing by way of example a preferred embodiment of the inventive idea.

In the drawings forming part of the application:

Figure 3 is an enlarged sectional detail showing one section of the tenderizing unit in place supported in the casing and also showing the cover in closed position.

Figure 4 is a sectional view similar to that shown in Figure 3 looking in the opposite direction and showing the other of the sections of the tenderizing unit supported in position within the casing.

Figure 5 is a front view of my casing support showing the cover elevated and the tenderizing unit in position to be inserted into operative position in the casing.

Figure 6 is an enlarged section longitudinally through the casing showing the tenderizing unit removed, the cover of the casing closed together with the electric motor and gear transmission.

Figure 1:
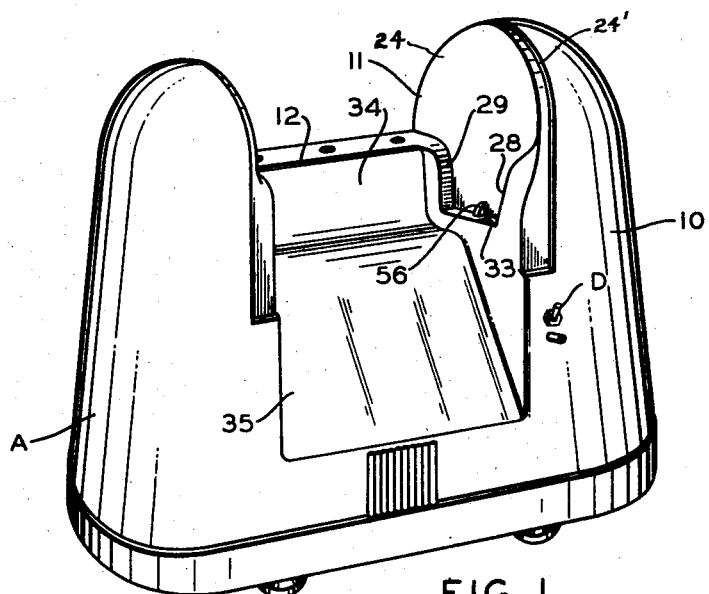
Figure 1 is a perspective view of my casing support showing the cover thereof removed and illustrating the central recess with the forwardly inclined bottom wall and showing one end wall with the shoulders and horizontal shelf which receive and position the free end of the tenderizing unit.

My casing support for meat processing and tenderizing unit is composed of an outer housing 10 constructed of metallic or non-metallic material. A recess 11 is formed in the housing 10 adapted to receive the processing and tenderizing unit B. The unit receiving recess 11 has a shelf 12 formed longitudinally of the rear portion thereof to which is hinged the cover portion 13 which is virtually flush with the outer casing and completely covers the tenderizing unit B when the same is closed for operation. The cover 13 is formed with the meat receiving slot 13 on the top portion thereof. I provide a series of gears within the housing 10 which are adapted to drive the clutches or couplers 22. The couplers 22 are cuplike in shape and have the engaging teeth 23 formed on the rims thereof. The recess 11 formed in the outer casing 10 is finished off in the upper portion thereof by the end wear or striker metal plates 24 and 25 which define part of the recess 11, the plates 24 and 25 being secured by the bolts 26 and 27 respectively. The bolts 26 and 27 are secured into the upright end walls 24' and 25' respectively. The end striker plate 24 is formed with the keystone-shaped inclined shoulders 28 and 29 which are adapted to position and maintain the ends of the sections of the tenderizing unit B together. The end striker plate 25 is formed with the shoulders 30 and 31 which engage with the projecting shoulders 61 formed on the ends of the hand rails 46 of the unit B. The shoulders 28 and 29 together with shoulders 30 and 31 may be formed integrally with the housing 10.

The projecting shoulders 61 are not only in engagement with the shoulders 30 and 31 but rest on the shelf 32 formed between the shoulders 30 and 31 to properly place the unit B in working position in the recess 11 in conjunction with the shoulders 28 and 29 and also the horizontal shelf 33. The horizontal shelf 33 which is formed between the lower ends of the shoulders 28 and 29 supports the lower edges of the sections of the processing unit B when the unit B is in operating position in the recess 11.

The clutches or couplers 22 are recessed in the lower thickened portion of the plate 25 and are virtually flush with the surface thereof. A longitudinally and vertically extending wall portion 34 inclines from the shelf portion 12 downwardly to an arcuated portion beneath the unit B and then slants downwardly toward the front of the casing 10 to form a meat chute surface 35, all of which is part of the bottom of the recess 11 hereinbefore mentioned.

The bolts 12' support the lower plate 36 of the hinge 37. The upper plate 38 of said hinge is secured by the bolts 39 to the cover 13. The front free end 40 of the cover 13 may be engaged to lift the cover by inserting the hand in the lower end of the recess 11 adjacent the wall 35 of the bottom of the recess. When the cover 13 is raised into position shown in Figure 5, the sectional tenderizing unit B is exposed. This permits the operator to engage the unit B to lift it from the recess 11 or re-insert it therein. The sectional tenderizing unit B which is used with my casing support 10 is made in two sections 41 and 42, illustrated in Figures 3 and 4 where each is illustrated as supported separately in my casing support 10. Each section 41 and 42 of the unit B is provided with a tenderizing roller 43 which is made up of a series of draw cutting knife toothed discs 44.

The end frame portions of the sections 41 and 42 of the unit B have a meeting or bearing surface 49 which virtually centrally divides the sections and which provides a bearing surface so that the frames of the sections 41 and 42 may bear against each other when the ends of the sections are in position against the shoulders 28 and 29 and the ends 61 of the hand rails 46 are against the shoulders 30 and 31. The ends of the frames of the sections 41 and 42 are formed with inclined surfaces which engage the inclined surfaces or shoulders 28 and 29 when the unit B is inserted into the recess 11 for operation.

A central lug 56 is formed projecting from the shelf 33, and this lug 56 is adapted to fit into recesses formed in the ends of the frames of the sections 41 and 42. The lug 56 thus contacts the ends of each of the sections 41 and 42 and thereby retains the respective sections individually and collectively in the recess 11 as illustrated in Figures 3 and 4. It is desirable that the sections 41 and 42 be individually placed in the recess 11 when it is necessary to sharpen the ends of the teeth of the blades 44, whereupon a sharpening instrument may be held approximately on the line 58, illustrated in Figure 6, or the line 59, illustrated in Figure 7. The motor 20 may be operated to rotate either of the sections 41 or 42 individually when they are positioned as illustrated in Figures 3 or 4. The unit B is formed with a horizontally projecting shoulder 61 formed on the ends of the hand rails 46 adapted to engage the inclined surfaces 30 and 31 and rest upon the shelf 32 to properly place the unit B in working position in the recess 11. The lower edges of the ends of the frame sections 41 and 42 are adapted to rest upon the horizontal shelf 33 when the unit B is in working position in the recess 11.

Figure 2:
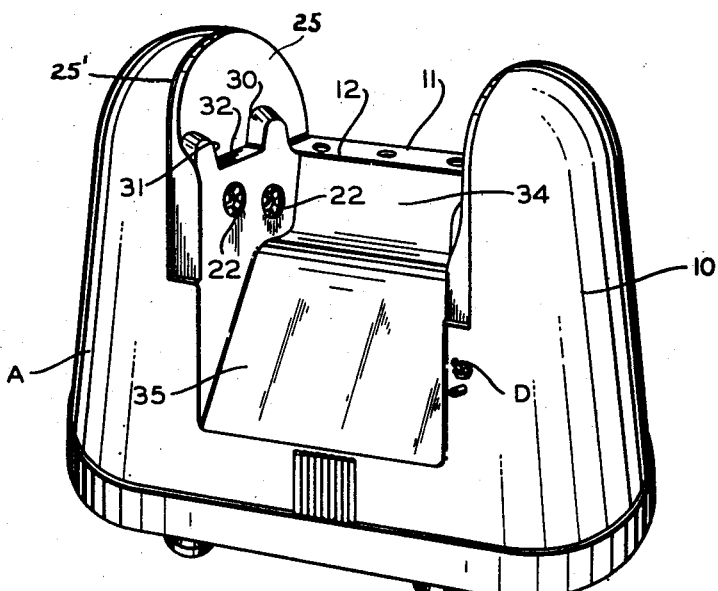
Figure 2 is a perspective view looking toward the front of the casing support with the cover removed and looking toward the opposite end to that shown in Figure 1 to illustrate the shoulders and shelf for positioning the end of the processing unit to allow engagement of the clutch ends of the shafts of the processing unit.

A further feature of primary importance resides in the manner in which the unit B is automatically locked in the recess 11 by engaging with the inclined shoulders 28 and 29 which engage with the end surfaces of the unit B and by the engagement of the lugs 61 which engage the shoulders 30 and 31 to securely position the sections 41 and 42 while in the recess 11 in operating position. This means of joining the separable sections 41 and 42 is unique in that it holds the sections together as a unit during their operation of tenderizing meat. It is apparent that when the unit B is removed from the recess 11, as illustrated in Figures 1 and 2, the entire recess is accessible for easy cleaning. At the same time the power unit including the motor 20 is cleansed and protected. It is very desirable that a meat tenderizing or processing machine of this character be made absolutely sanitary for complete cleansing and inspection at all times.

When the unit B is removed from the casing support, the sections 41 and 42 may be individually placed under a water faucet to easily and effectively cleanse the respective sections of the unit. I thus provide a casing support for a processing or tenderizing unit, such as B, which supports the unit for operation in a unique efficient manner.

Each section of the unit B is provided with an end portion 52 which is an extension of the roller 43 and has the keys 53 which engage with the couplers 22 as one or both sections of the unit B are inserted in the recess 11 as hereinbefore described.

The invention is not to be understood as restricted to the details set forth since these may be modified within the scope of the appended claims without departing from the spirit and scope of the invention.

Having thus described the invention, what I claim as new and desire to secure by Letters Patent is:

1. In a meat tenderizing machine having a casing with a recess formed therein, said recess having two substantially vertical, oppositely positioned end walls; unit positioning striker plates secured in each of said end walls; shoulders formed on one of said positioning striker plates; a positioning shelf connecting the lower portions of said shoulders; shoulders formed on the other of said striker plates; and a positioning shelf formed between the lower ends of said second mentioned shoulders.

2. In a meat tenderizing machine having casing with a recess formed therein, said recess having two substantially vertical, oppositely positioned end walls; shoulders formed in one of said end walls; a positioning shelf formed between the lower portions of said shoulders; shoulders formed in the other end of said recess; and a positioning shelf formed between said second mentioned shoulders.

3. In a casing for a tenderizing unit consisting of a body portion and a recess formed in said body portion adapted to receive and support the tenderizing unit and having oppositely positioned end walls: keystone-like cam shoulders in each end wall of said recess adapted to engage the tenderizing unit to support the same in said casing.

4. In a casing support for a sectional, readily separable, removable food processing unit having a recess formed integral with said casing: an inclined bottom for said recess, a horizontal shelf formed at the top of said bottom and a cover hingedly supported on said shelf adapted to close said recess; substantially vertical end walls for said recess, and inwardly inclined shoulders projecting from said end walls adapted to support the tenderizing unit.

5. In a casing support for a removable sectional meat tenderizing unit, said casing support having a body portion and a recess formed in said body portion adapted to receive and support the tenderizing unit, each section of said unit having a recess formed in its lower edge; keystone-like cam shoulders in each end of said recess, a shelf portion connecting the lower ends of said shoulders in each end of said recess, lug means formed on one of said shelf portions adapted to engage the recesses formed in the sections of the unit to separately support each section of the unit in the recess.

ALDRICH L. JACKSON.

REFERENCES CITED

The following references are of record in the file of this patent:

UNITED STATES PATENTS

| Number | Name | Date |
| --- | --- | --- |
| 2,409,463 | Ahrndt | Oct. 15, 1946 |
| 2,450,688 | Richard | Oct. 5, 1948 |
| 2,513,025 | Jackson | June 27, 1950 |